United States Patent
Furlan et al.

(10) Patent No.: US 7,183,330 B2
(45) Date of Patent: Feb. 27, 2007

(54) SILICONE SURFACTANTS FOR RIGID POLYURETHANE FOAM MADE WITH HYDROCARBON BLOWING AGENTS

(75) Inventors: Wayne Robert Furlan, Hellertown, PA (US); Mark Leo Listemann, Kutztown, PA (US); Joan Sudbury-Holtschlag, Auburn, MI (US); Thomas John Markley, Blandon, PA (US); Gary Dale Andrew, Walnutport, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 79 days.

(21) Appl. No.: 10/736,042

(22) Filed: Dec. 15, 2003

(65) Prior Publication Data

US 2005/0131090 A1 Jun. 16, 2005

(51) Int. Cl.
*C08J 9/14* (2006.01)
*C08G 77/46* (2006.01)

(52) U.S. Cl. ............ 521/112; 521/114; 521/128; 521/129; 521/130; 521/131; 521/170; 521/172; 521/173; 521/174; 521/176

(58) Field of Classification Search ............ 521/112, 521/114, 130, 131, 128, 129, 170, 172, 173, 521/174, 176
See application file for complete search history.

(56) References Cited

U.S. PATENT DOCUMENTS

| | | | |
|---|---|---|---|
| 4,997,706 A | | 3/1991 | Smits et al. |
| 5,235,017 A | * | 8/1993 | O'Lenick, Jr. ............ 528/26 |
| 5,426,127 A | | 6/1995 | Doerge |
| 5,432,206 A | | 7/1995 | Stanga et al. |
| 5,461,084 A | | 10/1995 | Doerge |
| 5,525,640 A | | 6/1996 | Gerkin et al. |
| 5,686,499 A | * | 11/1997 | Fishback ............ 521/112 |
| 5,883,142 A | | 3/1999 | Chojnacki et al. |
| 6,221,979 B1 | * | 4/2001 | Lin et al. ............ 525/477 |
| 6,359,022 B1 | | 3/2002 | Hickey et al. |
| 6,891,051 B1 | * | 5/2005 | Wohlman et al. ............ 554/77 |

2001/0014387 A1 8/2001 Giampaolo

FOREIGN PATENT DOCUMENTS

EP 1 156 077 A1 11/2001

OTHER PUBLICATIONS

"Silicone Surfactants for the Polyurethane Industry", Siltech—Innovative Silicon Specialties, Feb. 2004.*
M.C. Bogdan, et al., "Status Report on the Development of HFC-245fa as a Blowing Agent," Polyurethane Expo '96, 1996, pp. 394-403.
T.W. Bodnar, et al., "New Surfactant Technology for HCFC-123 and HCF-141b Blown Rigid Foam Systems," Polyurethane World Congress, 1991, pp. 191-196.
P.P. Barthelemy, et al., "Latest Results in the Development of Next Generation HFC Blowing Agents," Polyurethane 1995, pp. 26-33.
European Search Report No. 04029209.6-2115 dated Mar. 30, 2005.

* cited by examiner

Primary Examiner—John M. Cooney, Jr.
(74) Attorney, Agent, or Firm—Michael Leach

(57) ABSTRACT

A method for making a rigid polyurethane foam by reacting a polyisocyanate and a polyol in the presence of a urethane catalyst, a blowing agent and a silicone surfactant characterized by employing a blowing agent comprising a C4 or C5 hydrocarbon, or mixtures thereof, with an average molecular weight of $\leq 72$ g/mole and a boiling point in the range of 27.8 to 50° C., and a silicone surfactant comprising a polyether-polysiloxane copolymer represented by the following formula:

$$(CH_3)_3-Si-O-(Si(CH_3)_2-O)_x-(Si(CH_3)(R)O)_y-Si(CH_3)_3$$

where $$R=(CH_2)_3-O-(-CH_2-CH_2-O)_a-(CH_2-CH(CH_3)-O)_b-R'', \text{ and}$$

where R" is H, $(CH_2)_zCH_3$, or $C(O)CH_3$; x+y+2 is 60–130; x/y is 5–14; z is 0–4; the total surfactant molecular weight, based on the formula, is 7000–30,000 g/mole, the wt % siloxane in the surfactant is 32–70 wt %, the blend average molecular weight (BAMW) of the polyether portion is 450–1000 g/mole, and the mole % of ethylene oxide in the polyether portion is 70–100 mole %.

22 Claims, No Drawings

SILICONE SURFACTANTS FOR RIGID POLYURETHANE FOAM MADE WITH HYDROCARBON BLOWING AGENTS

BACKGROUND OF THE INVENTION

The present invention relates to cell stabilizers for making polyurethane foams and, more particularly, relates to silicone surfactant cell stabilizers for making rigid polyurethane foams.

Due to changing government requirements, specifically the Montreal Protocol, which regulate the use of ozone-depleting materials, the primary blowing agent currently being used by the industry (in the United States) for applications where good insulating properties are needed is HCFC-141b. However, the Montreal Protocol dictates that this material must be phased out, with phase out dates for countries varying. Potential replacements, the 'third generation' blowing agents, are partially hydrogenated fluorocarbons (HFCs) and some hydrochlorofluorocarbons (HCFCs) and include compounds such as HFC-134a, HFC-236ea, HFC-245fa, HFC-365mfc, and HCFC-22. However, these may not allow for optimal performance in current foam formulations.

For foams used in various market segments, for example the appliance and water heater markets, the blowing agent must produce rigid foams with good insulating values, i.e., low thermal conductivities (low k-factors). Water heaters and refrigerators both must conform to energy requirements established by the U.S. Department of Energy. Additionally, it is anticipated that these requirements will become even more stringent in the future.

As a direct replacement for HCFC-141b in an appliance foam formulation, third generation blowing agents yield rigid foam in which there is a small to moderate increase in k-factors. The choice of silicone surfactant in the formulation has a direct impact upon the magnitude of this increase in k-factor. That is, the proper choice of surfactant can minimize the potential loss in insulating capability of the foam when converting to a third generation blowing agent.

A variety of papers have been published which discuss the general topic of third generation HFC/HCFC blowing agents and their inferior insulating capability when compared with CFC-11 or HCFC-141b. One, for example, is Barthlemey, P. P.; Leroy, A.; *POLYURETHANE* 1995 *Proceedings of the Polyurethanes 1995 Conference*, September, 1995, pp. 26–33.

Bogdan, M. C., et al, Proceedings of Polyurethanes EXPO '96, October, 1996, pp. 394–403, discusses the importance of surfactant choice for optimization of k-factor in rigid polyurethane foam. It lists several surfactants which have been tested in foams made with HFC-245fa as the blowing agent. Furthermore, it concludes that Th. Goldschmidt's B8404 and B8462 and OSi's L-6900 are the best performing silicone surfactants identified to date for improving the foam quality in HFC-245fa-blown foam, including the k-factor and % closed cell content. These polyether-polysiloxane copolymer surfactants each have a calculated total surfactant molecular weight, based on NMR structural analysis, of <10,000 g/mole.

Bodnar, T. W., et al, "New Surfactant Technology for HCFC-123 and HCFC-141b Blown Rigid Foam Systems", Polyurethane World Congress 1991, pp. 24–26, discusses surfactants to optimize rigid foam properties using traditional rigid foam surfactants.

U.S. Pat. Nos. 5,461,084 and 5,426,127 disclose the use of HFC blowing agents and B-8426 silicone surfactant in rigid polyurethane foam for low k-factor and good physical properties.

U.S. Pat. No. 4,997,706 discloses the use of C2–C6 polyfluorocarbon compounds containing no Cl or Br atoms as physical blowing agents for rigid closed cell polymer foams. The benefit is that the loss in thermal insulation performance with time compared to foams made in absence of these compounds is reduced.

U.S. Pat. No. 5,432,206 discloses silicone surfactants for making stable polyurethane foam.

U.S. Pat. No. 5,990,187 discloses a preferred range for silicone surfactants used in rigid foam applications.

U.S. Pat. No. 5,525,640 discloses the use of certain surfactants for polyurethane foam made with an inert gas blowing agent.

U.S. Pat. No. 5,883,142 discloses certain polyether-polysiloxane copolymers as silicone surfactants for use in making rigid polyurethane foams with third generation blowing agents.

U.S. Pat. No. 4,529,743 and references therein disclose certain polyether-polysiloxane copolymers as silicone surfactants for use in making rigid polyurethane foams.

BRIEF SUMMARY OF THE INVENTION

The present invention provides a silicone surfactant (polyether-polysiloxane copolymer) for stabilizing the cell formation in the preparation of a rigid polyurethane and/or polyisocyanurate foam by the reaction of a polyisocyanate and a polyol in the presence of a urethane catalyst and a blowing agent which is a C4 or C5 hydrocarbon, or mixtures thereof, with an average molecular weight of $\leq 72$ g/mole, a boiling point in the range of 27.8 to 50° C., and preferably an Ozone Depleting Potential (ODP) of <0.10. The silicone surfactant comprises a polyether-polysiloxane copolymer represented by the following formula:

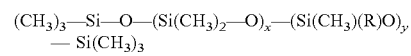

where

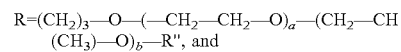

where R" is H, $(CH_2)_zCH_3$ or $C(O)CH_3$; x+y+2 is 60–130; and x/y is 5–14; z is 0–4; and the total surfactant molecular weight, based on the formula, is about 7000–30,000 g/mole, the wt % siloxane in the copolymer is 32–70 wt %, the blend average molecular weight (BAMW) of the polyether portion is 450–1000 g/mole, and the mole % of ethylene oxide in the polyether portion is 70–100 mole %, or, equivalently, 64–100 wt %.

Use of the above-defined silicone surfactants in the production of rigid polyurethane foams using a C4 and/or C5 hydrocarbon blowing agent provides one or more of the following advantages:

Foams with improved performance properties in appliance applications.

Improvement in thermal insulation.

Improvement in minimum fill properties that relate to a reduction in density.

Reduction in voiding which relates to how well the foam fills the mold without excessively large air pockets just below the surface of the foam.

Enhanced surfactant compatibility in the polyol showing decreased tendency for the hydrocarbon based blowing agent to separate after accelerated aging at 4° C.

In this specification and the claims, the term "polyurethane" is intended to mean polyurethane and/or polyisocyanurate as is understood in the art. Thus a rigid polyurethane foam can be a rigid polyurethane and/or polyisocyanurate foam.

DETAILED DESCRIPTION OF THE INVENTION

The process according to the invention can easily be carried out by conventional means for making rigid polyurethane foam using, for example, an explosion-proof, high pressure Cannon foam machine, except that the preparation of the rigid polyurethane foam using a C4–C5 hydrocarbon is carried out using a polyether-polysiloxane copolymer according to the invention as the cell stabilizer.

The polyurethane rigid products are prepared using any suitable organic polyisocyanates well known in the art for making rigid polyurethane foam including, for example, hexamethylene diisocyanate, isophorone diisocyanate, phenylene diisocyanate, toluene diisocyanate ("TDI") and 4,4'-diphenylmethane diisocyanate ("MDI"). Especially suitable are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Other suitable isocyanates are the 2,4- and 2,6-TDI's individually or together as their commercially available mixtures. Also suitable are "prepolymers" of these polyisocyanates comprising a partially prereacted mixture of a polyisocyanate and a polyether or polyester polyol. Preferably, the above polyisocyanates are used in an isocyanate index range of 80 to 400.

Suitable polyols are those polyols typically used in the art for making rigid polyurethane foam including the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, sugars, such as sucrose, and like low molecular weight polyols. Also useful are amine polyether polyols which can be prepared by reacting an amine, such as ethylenediamine, diethylenetriamine, tolylenediamine, diphenylmethanediamine, triethanolamine or the like, with ethylene oxide or propylene oxide.

In the practice of this invention, a single high molecular weight polyether polyol may be used. Also, mixtures of high molecular weight polyether polyols such as mixtures of different multifunctional materials and/or different molecular weight or different chemical composition materials may be used.

Useful polyester polyols include those produced by reacting a dicarboxylic acid with an excess of a diol, for example, adipic acid or phthalic acid/anhydride with ethylene glycol or butanediol, or reacting a lactone with an excess of a diol such as caprolactone with propylene glycol.

The catalyst composition may be any catalyst well known in the urethane art such as tertiary amines, organotin and carboxylate urethane catalysts (gelling and/or blowing). Typical examples of useful catalysts are amine catalysts such as triethylene-diamine, dimethylcyclohexylamine, tetramethylhexanediamine, bis(dimethylaminoethyl)-ether, tri (dimethylaminopropyl)hexahydrotriamine, 1-isobutyl-2-methylimidazole, 1,2-dimethylimidazole, dimethylaminoethanol, diethylaminoethanol, pentamethyldiethylene-triamine, pentamethyldipropylenetriamine, methyl morpholine, ethyl morpholine, quaternary ammonium salts, salts of an organic acid and tin catalysts such as dibutyltin dilaurate and the like.

A catalytically effective amount of the catalyst composition is used in the polyurethane formulation. More specifically, suitable amounts of the catalyst composition may range from about 0.01 to 10 parts by weight per 100 parts polyol (0.01 to 10 pphp) in the polyurethane formulation, preferably 0.5 to 4 pphp.

The blowing agent compositions used in the present invention for making rigid foams comprise a C4 and/or C5 hydrocarbon composition with an average molecular weight of less than or equal to 72 g/mole, a boiling point of 27.8–50.0° C. (82–122° F.), and preferably an Ozone Depleting Potential (ODP) of <0.10, ODP as described by: Synthesis of the Reports of the Ozone Scientific Assessment Panel, Environmental Effects Assessment Panel Technology and Economic Assessment Panel, Prepared by the Assessment Chairs for the Parties to the Montreal Protocol, November 1991 and desirably a flash point <−17.8° C. (<0° F.). Illustrative of hydrocarbon compositions meeting this requirement as blowing agents are cyclopentane, isopentane, isobutane and various blends thereof. Useful blends would range from <100 to 50 wt % cyclopentane and >0 to 50 wt % isopentane, based on C5 components, and optionally may also contain butane isomers.

Also suitable as blowing agents for the rigid polyurethane foams using the polyether-polysiloxane copolymer surfactants of the invention are C1–C4 HFCs or HCFCs with a molecular weight of 50 to 170 g/mole, a boiling point of −60° to +50° C., and preferably an Ozone Depleting Potential (ODP) of <0.10. HFCs and HCFCs meeting this criteria include HFC-134a, HFC-236ea, HFC-365mfc, HCFC-22 and preferably HFC-245fa.

Water may be included in the polyurethane foam formulation as an auxiliary blowing agent at 0 to 4 pphp.

Other blowing agents which may optionally be used in combination with the defined hydrocarbons and/or C1–C4 HFC or HCFC include CFCs, other HCFCs, other HFCs and the like.

The silicone surfactant cell stabilizer in an amount of 0.5 to 3.5 pphp, preferably 1.5 to 2.5 pphp, may be any polyether-polysiloxane copolymer of the following structure

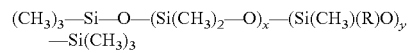

where

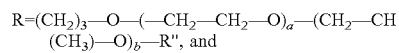

where the calculated total surfactant molecular weight, based on the structure, is about 7000 to 30,000 g/mole, preferably 15,000 to 28,000 g/mole; the wt % siloxane in the surfactant copolymer is 32 to 70 wt %, preferably 34 to 53 wt %; the BAMW of the polyether portion is 450 to 1000 g/mole, preferably 550 to 850 g/mole; and the % ethylene oxide (EO) in the polyether portion is preferably 70 to 100 mole %, or, equivalently, 64 to 100 wt %; or alternatively 70 to 80 mole %, or, equivalently, 64 to 75 wt %. In addition, R" can be H, $(CH_2)_2CH_3$, or $C(O)CH_3$, preferably R" is H or $CH_3$, and x+y+2 is 60–130, preferably 110 to 130; and x/y is 5 to 14, preferably 5 to 8; z is 0–4; a+b is 10 to 18, preferably 12 to 16. These polyether-polysiloxane copolymers can be used as the sole surfactant or in combination with another silicone surfactant which falls outside of the range described here.

The polyether-polysiloxane copolymer surfactant molecules with the following structural ranges are useful for improving the performance of a hydrocarbon blown polyurethane foam.

| STRUCTURE | Range 1 | Range 2 | Range 3 | Preferred |
|---|---|---|---|---|
| DP (x + y + 2) | 60–130 | 90–130 | 60–80 | 110–130 |
| D/D" (x/y) | 5–10 | 10–14 | 5–8 | 5–8 |
| Oxide Units (a + b) | 10–18 | 10–16 | 10–16 | 12–16 |
| Mole % EO (a/(a + b)) | 70–100 | 70–80 | 70–100 | 70–100 |

The prior art, especially the polyurethane foam art, is replete with examples of polyether-polysiloxane copolymers. The methods and materials used in making and capping the various polyether-polysiloxane copolymers are well known in the art.

The usual procedures for manufacturing such materials results in a molecule in which one end of the polyether (polyoxyalkylene) is capped with an unsaturated group such as allyloxy in order to be able to react with methylhydrogenpolysiloxanes to create the polyether-polysiloxane copolymers. This is possible through hydrosilylation using noble metal catalysts, wherein the polysiloxanes have a certain number of methylhydrogensiloxane units in their molecules that react with the unsaturated groups of the polyethers to form Si—C bonds. Generally, the polyether copolymers can be capped before the hydrosilylation, or they can be capped after the hydrosilylation. Whatever the case, the normal preparative method for the unsaturated polyether copolymers is to co-react, for example, allyl alcohol with ethylene oxide and then react this polymer with propylene oxide such that the polyether copolymer molecule ends up with primarily secondary alcohol groups at its non-unsaturated end. In other methods, a random copolymer can be formed by reacting ethylene oxide, propylene oxide and allyl alcohol to provide a material having large numbers of carbinols on the secondary carbon atoms of the propylene glycol that is formed. So that the polyether materials could be reacted into polysiloxanes, and eventually participate in, for example polyurethane foam production as surfactants, the carbinols are quite often endblocked, a common endblocker being acyloxy.

Procedures for synthesizing nonhydrolyzable silicone surfactants having polyether pendant groups are well known. Representative disclosures are provided in U.S. Pat. Nos. 4,147,847 and 4,855,379 which are hereby incorporated by reference.

Other typical agents which may be used in the polyurethane rigid foam formulations include flame retardants and chain extenders such as ethylene glycol and butanediol.

A general polyurethane rigid foam formulation having a 1.5–2.5 lb/ft³ (24–40 kg/m³) density (e.g., appliance foam) containing a silicone surfactant such as the polyether-polysiloxane copolymer according to the invention and a hydrocarbon blowing agent, for example Exxsol HP-95 blend of cyclopentane and isopentane, would comprise the following components in parts by weight (pbw):

| Rigid Foam Formulation | pbw |
|---|---|
| Polyol | 100 |
| Silicone Surfactant | 1–3 |
| Blowing Agent | 10–20 |
| Water | 0–3 |
| Catalyst | 0.5–3 |
| Isocyanate Index | 80–400 |

Following Examples 1–21 used the rigid polyurethane appliance foam formulation of Table 1.

TABLE 1

| Component | Parts by Weight |
|---|---|
| Polyol[a] | 100 |
| Amine Catalysts | 2.6 |
| Water | 2.0 |
| Cyclopentane | 10 |
| Isopentane | 4 |
| Polymeric MDI | NCO Index = 115 |

[a]Sucrose initiated polyether polyol, OH number = 360.

The ingredients in Table 1 were combined and premixed in a 10-gallon (37.85 L) explosion proof vessel at 25° C. The compositions were added into a Cannon A-40 high pressure explosion proof metering system. Varying surfactant compositions were added at the same level into the formulations. The polyether-polysiloxane copolymer surfactant was added in an amount equal to 2.0 parts by weight per 100 parts of polyol. Polymeric MDI at 23° C. was added in an amount such that the isocyanate (NCO) index was 115. The mixture was mixed under high pressure and metered at a rate of 200 g/sec into a Brett mold 200×20×5 cm dimensions heated to 49° C. Enough of the foaming mixture was added to the mold to yield a plaque which was 12% overpacked. The foam plaque was removed from the mold after 7 minutes and aged at 23° C. for 18 to 24 hours. A 20.3×20.3×2.54 cm portion was cut from the center of the plaque and tested in a Lasercomp Fox-200 heat flow meter and the lambda value measured.

Performance Testing

% min Fill—Calculated as the minimum amount of foam required to fill a Brett mold of dimensions of 200 cm×20 cm×5 cm. The % min fill is expressed as a % of a control material which is set to 100%.

Lambda (W/m° K)—Measured on a LaserComp heat flow meter.

Clarity—Based on visual observation: 4=cloudy, 3=semi cloudy, 2=slight cloudy and 1=clear.

Phase Separation—100 gram samples were prepared and placed in small vials and held at 4° C. for 7 days. The rating scale: 1=one phase, 2=two phase, 3=three phases.

Voiding—Based on Dow publication "Excellent Insulating properties and Fast Demold and Optimum Process and Applying the Power of the AND in PU Rigid Foams for Appliance"—Paula Alto.

EXAMPLES 1–3

In these examples the polyether-polysiloxane surfactant was varied from a DP (degree of polymerization) of 14.4 to 120, while holding D/D'=2.4, Oxide Units at 12 and mole % ethylene oxide (EO) at 100. These runs demonstrated inferior performance of polyether-polysiloxane surfactants with low D/D' in a hydrocarbon appliance formulation when compared to the control target values.

| Polyether-Polysiloxane Surfactant Structure | | Target Values | 1 | 2 | 3 |
|---|---|---|---|---|---|
| DP | $x + y + 2$ | | 14.4 | 67.2 | 120 |
| D/D' | $x/y$ | | 2.4 | 2.4 | 2.4 |
| Oxide Units | $a + b$ | | 12 | 12 | 12 |
| mole % EO | $(a/a + b) \times 100$ | | 100 | 100 | 100 |
| Physical properties | | | | | |
| Min Fill | | >95% | 84.5 | 81.5 | 80.13 |
| Lambda (W/m° K) | | ≤0.023 | 0.025 | 0.025 | 0.024 |
| % Voiding | | ≤1.0% | 3.8 | 2.6 | 3.0 |
| Clarity | | ≤3.0 | 2.5 | 2.5 | 2.5 |
| Phase Separation | | One Phase ≤ 2 | 1.3 | 1.3 | 1.3 |

EXAMPLES 4–6

In these examples varying the polyether-polysiloxane surfactant from a DP of 14.4 to 120, while holding D/D'=7.2, Oxide Units at 12 and mole % EO at 100 yielded foam performance in an acceptable range, meeting or exceeding requirements when DP>14.4.

| Polyether-Polysiloxane Surfactant Structure | | Target Values | 4 | 5 | 6 |
|---|---|---|---|---|---|
| DP | $x + y + 2$ | | 14.4 | 67.2 | 120 |
| D/D' | $x/y$ | | 7.2 | 7.2 | 7.2 |
| Oxide Units | $a + b$ | | 12 | 12 | 12 |
| mole % EO | $(a/a + b) \times 100$ | | 100 | 100 | 100 |
| Physical properties | | | | | |
| Min Fill | | >95% | 97.9 | 96.2 | 96.2 |
| Lambda (W/m° K) | | ≤0.023 | 0.023 | 0.022 | 0.022 |
| % Voiding | | ≤1.0% | 2.4 | 0.7 | 0.6 |
| Clarity | | ≤3.0 | 2.3 | 2.5 | 2.5 |
| Phase Separation | | One Phase ≤ 2 | 1.5 | 1.5 | 1.5 |

EXAMPLES 7–9

Varying the polyether-polysiloxane surfactant from a DP of 14.4 to 120, while holding D/D'=12, Oxide Units at 12 and mole % EO at 100, provides examples where many of the foam performance qualities were below requirements. These examples show that, while D/D'=12 and varying the DP, the voiding, clarity and phase separation properties were not acceptable.

| Polyether-Polysiloxane Surfactant Structure | | Target Values | 7 | 8 | 9 |
|---|---|---|---|---|---|
| DP | $x + y + 2$ | | 14.4 | 67.2 | 120 |
| D/D' | $x/y$ | | 12 | 12 | 12 |
| Oxide Units | $a + b$ | | 12 | 12 | 12 |
| mole % EO | $(a/a + b) \times 100$ | | 100 | 100 | 100 |
| Physical properties | | | | | |
| Min Fill | | >95% | 98.2 | 98.0 | 99.4 |
| Lambda (W/m° K) | | ≤0.023 | 0.023 | 0.022 | 0.022 |
| % Voiding | | ≤1.0% | 3.8 | 2.6 | 3.0 |
| Clarity | | ≤3.0 | 2.5 | 2.5 | 2.5 |
| Phase Separation | | One Phase ≤ 2 | 1.3 | 1.3 | 1.3 |

EXAMPLES 10–12

Varying the polyether-polysiloxane surfactant from a DP of 14.4 to 120, while holding D/D at 2.4, Oxide Units at 12 and mole % EO at 75 showed the polyurethane foam performance was below the requirements at all DP levels.

| Polyether-Polysiloxane Surfactant Structure | | Target Values | 10 | 11 | 12 |
|---|---|---|---|---|---|
| DP | $x + y + 2$ | | 14.4 | 67.2 | 120 |
| D/D' | $x/y$ | | 2.4 | 2.4 | 2.4 |
| Oxide Units | $a + b$ | | 12 | 12 | 12 |
| mole % EO | $(a/a + b) \times 100$ | | 75 | 75 | 75 |
| Physical properties | | | | | |
| Min Fill | | >95% | 88.5 | 86.10 | 85.41 |
| Lambda (W/m° K) | | ≤0.023 | 0.025 | 0.024 | 0.024 |
| % Voiding | | ≤1.0% | 3.7 | 2.1 | 2.0 |
| Clarity | | ≤3.0 | 2.4 | 2.4 | 2.4 |
| Phase Separation | | One Phase ≤ 2 | 1.6 | 1.6 | 1.6 |

EXAMPLES 13–15

Varying the polyether-polysiloxane surfactant from a DP of 14.4 to 120, while holding D/D'=7.2, Oxide Units at 12 and mole % EO at 75% showed optimum performance at the DP range from 67.2 to 120 in Examples 14 and 15.

| Polyether-Polysiloxane Surfactant Structure | | Target Values | 13 | 14 | 15 |
|---|---|---|---|---|---|
| DP | $x + y + 2$ | | 14.4 | 67.2 | 120 |
| D/D' | $x/y$ | | 7.2 | 7.2 | 7.2 |
| Oxide Units | $a + b$ | | 12 | 12 | 12 |
| mole % EO | $(a/a + b) \times 100$ | | 75 | 75 | 75 |
| Physical properties | | | | | |
| Min Fill | | >95% | 99.8 | 98.6 | 97.8 |
| Lambda (W/m° K) | | ≤0.023 | 0.023 | 0.022 | 0.022 |
| % Voiding | | ≤1.0% | 3.14 | 0.96 | 0.37 |
| Clarity | | ≤3.0 | 2.7 | 2.7 | 2.7 |

-continued

| Polyether-Polysiloxane Surfactant Structure | Target Values | 13 | 14 | 15 |
|---|---|---|---|---|
| Phase Separation | One Phase ≦ 2 | 1.8 | 1.8 | 1.8 |

EXAMPLES 16–18

Varying the polyether-polysiloxane surfactant from a DP of 14.4 to 120, while holding D/D'=12, Oxide Units at 12 and mole % EO at 75 showed that a high DP=120 in Example 18 was capable of meeting the performance requirements.

| Polyether-Polysiloxane Surfactant Structure | | Target Values | 16 | 17 | 18 |
|---|---|---|---|---|---|
| DP | x + y + 2 | | 14.4 | 67.2 | 120 |
| D/D' | x/y | | 12 | 12 | 12 |
| Oxide Units | a + b | | 12 | 12 | 12 |
| mole % EO | (a/a + b) × 100 | | 75 | 75 | 75 |
| Physical properties | | | | | |
| Min Fill | | >95% | 97.8 | 98.2 | 100.4 |
| Lambda (W/m° K) | | ≦0.023 | 0.023 | 0.023 | 0.023 |
| % Voiding | | ≦1.0% | 4.8 | 2.1 | 1.0 |
| Clarity | | ≦3.0 | 3.0 | 3.0 | 3.0 |
| Phase Separation | | One Phase ≦2 | 2.0 | 2.0 | 2.0 |

EXAMPLES 19–21

These examples show the influence of the number of oxide units while holding constant DP=120, D/D'=7.2 and EO=75 mole %. While the oxide units increased from 12 to 24 the % Min Fill decreased and the number of voids increased outside the performance targets in Examples 20 and 21.

| Polyether-Polysiloxane Surfactant Structure | | Target Values | 19 | 20 | 21 |
|---|---|---|---|---|---|
| DP | x + y + 2 | | 120 | 120 | 120 |
| D/D' | x/y | | 7.2 | 7.2 | 7.2 |
| Oxide Units | a + b | | 12 | 18 | 24 |
| mole % EO | (a/a + b) × 100 | | 75 | 75 | 75 |
| Physical properties | | | | | |
| Min Fill | | >95% | 99.6 | 97.8 | 97.9 |
| Lambda (W/m° K) | | ≦0.023 | 0.022 | 0.022 | 0.022 |
| % Voiding | | ≦1.0% | 0.37 | 1.1 | 1.8 |
| Clarity | | ≦3.0 | 2.7 | 2.9 | 3.1 |
| Phase Separation | | One Phase ≦ 2 | 1.8 | 1.8 | 1.8 |

EXAMPLES 22–24

Examples 22 through 24 show the preferred range for a surfactant structure used in a hydrocarbon blown foam. In these examples the following structural properties are held constant at: DP=120, Oxide Units=14, and mole % EO=71, while D/D' varies between 5.4 and 7.2. In these examples the target performance values are able to be achieved in the hydrocarbon blown foam.

| Polyether-Polysiloxane Surfactant Structure | | Target Values | 22 | 23 | 24 |
|---|---|---|---|---|---|
| DP | x + y + 2 | | 120 | 120 | 120 |
| D/D' | x/y | | 5.7 | 6.5 | 7.2 |
| Oxide Units | a + b | | 14 | 14 | 14 |
| mole % EO | (a/a + b) × 100 | | 71 | 71 | 71 |
| Physical properties | | | | | |
| Min. Fill | | >95% | 96.3 | 98.0 | 99.2 |
| Lambda (W/m° K) | | ≦0.023 | 0.022 | 0.022 | 0.022 |
| % Voiding | | ≦1.0% | 0.82 | 0.65 | 0.55 |
| Clarity | | ≦3.0 | 2.7 | 2.7 | 2.8 |
| Phase Separation | | One Phase ≦ 2 | 1.7 | 1.8 | 1.8 |

EXAMPLES 25–27

Examples 25 through 28 show additional preferred ranges for a surfactant structure used in a hydrocarbon blown foam. In these examples the following structural properties are held constant at: DP=120, and mole % EO=75%. The oxide units are varied between 12 and 14, and the D/D' is between 5.7 and 7.2. These examples illustrate how the preferred ranges meet the target value for the structural properties of a silicone polyether surfactant used in a hydrocarbon blown urethane foam.

| Polyether-Polysiloxane Surfactant Structure | | Target Values | 25 | 26 | 27 | 28 |
|---|---|---|---|---|---|---|
| DP | x + y + 2 | | 120 | 120 | 120 | 120 |
| D/D' | x/y | | 5.7 | 5.7 | 7.2 | 7.2 |
| Oxide Units | a + b | | 12 | 14 | 12 | 14 |
| mole % EO | (a/a + b) × 100 | | 75 | 75 | 75 | 75 |
| Physical properties | | | | | | |
| Min. Fill | | >95% | 96.6 | 95.8 | 99.6 | 98.8 |
| Lambda (W/m° K) | | ≦0.023 | 0.022 | 0.022 | 0.022 | 0.022 |
| % Voiding | | ≦1.0% | 0.63 | 0.92 | 0.37 | 0.61 |
| Clarity | | ≦3.0 | 2.6 | 2.7 | 2.7 | 2.8 |

| Polyether-Polysiloxane Surfactant Structure | Target Values | 25 | 26 | 27 | 28 |
|---|---|---|---|---|---|
| Phase Separation | One Phase ≦ 2 | 1.7 | 1.7 | 1.8 | 1.8 |

U.S. Pat. No. 5,883,142 discloses that the silicone surfactant cell stabilizer in an amount of 0.5 to 3.5 pphp, preferably 1.5 to 2.5 pphp, may be any polyether-polysiloxane copolymer of the following structure

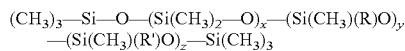

where

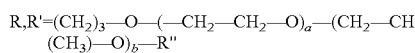

and where the calculated total surfactant molecular weight, based on the structure, is 12,000 to 100,000 g/mole; the wt % siloxane in the surfactant is 10 to 40 wt %; the BAMW of the polyether portion is 1200 to 6000 g/mole; and the wt % ethylene oxide in the polyether portion is 30 to 100 wt %. In addition, R" can be H, $CH_3$, or $C(O)CH_3$ and x is 50 to 200; y+z is 3 to 30; and x/(y+z) is 7 to 20.

27.8 to 50° C., and 0.5 to 3.5 parts by weight per 100 parts polyol (pphp) of a silicone surfactant comprising a polyether-polysiloxane copolymer represented by the following formula:

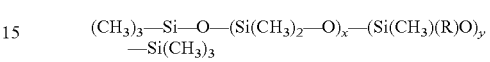

where

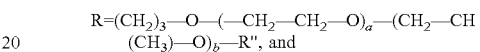

where R" is H, $(CH_2)_zCH_3$, or $C(O)CH_3$; x+y+2 is 67–130; x/y is 5–14; z is 0–4; a+b is 10–18; the total surfactant molecular weight, based on the formula, is 7000–30,000 g/mole, the wt % siloxane in the surfactant is 32–70 wt %, the average molecular weight of the polyether portion is 450–1000 g/mole, and the mole % of ethylene oxide in the polyether portion is 70–100 mole %.

|  | DP = x + y + z + 2 | x | y + z | x/y + z | MW (g/mol) | BAMW (g/mol) | EO (wt %) | EO (mole %) |
|---|---|---|---|---|---|---|---|---|
| U.S. Pat. No. 5883142 Broad Disclosure | 55 to 232 | 50 to 200 | 3 to 30 | 7 to 20 | 12,000 to 100,000 | 1200 to 6000 | 30 to 100 | 36 to 100 |
| Present Invention (z = 0) | 60 to 130 | 52.7 to 116.4 | 5.3 to 21.3 | 5 to 14 | 7000 to 30,000 | 450 to 1000 | 64 to 100 | 70 to 100 |

Moreover, a polyether-polysiloxane surfactant with DP of 110 to 130, a D/D' of 5 to 8, alkylene oxide units between 12 to 16 units and mole % EO in an EO/PO co-polymer of 70% to 100 mole % ethylene oxide can achieve optimum performance properties for rigid foam appliance applications. Improvements in thermal insulation and minimum fill properties that relate to a reduction in density can also be achieved. Reductions in voiding can be achieved which relate to how well the foam fills the mold without excessively large air pockets just below the surface of the foam. Further enhancements in surfactant compatibility in the polyol showed fewer tendencies for the hydrocarbon blowing agent to separate after accelerated aging at 4° C.

The present invention differs from U.S. Pat. No. 5,883,142 in the blend average molecular weight (BAMW) of the polyether portion of the polyether-polysiloxane copolymer and the required use of a C4 and/or C5 hydrocarbon blowing agent.

The invention claimed is:

1. In a method for making a rigid polyurethane foam by reacting a polyisocyanate and a polyol in the presence of a urethane catalyst, a blowing agent, optionally water, and a silicone surfactant, the improvement which comprises employing a blowing agent comprising a C4 or C5 hydrocarbon, or mixtures thereof, with an average molecular weight of ≦72 g/mole and a boiling point in the range of 2. The method of claim 1 in which x+y+2 is 67–130; x/y is 5–10; a+b is 10–18; and the mole % of ethylene oxide in the polyether portion is 70–100 mole %.

3. The method of claim 1 in which x+y+2 is 90–130; x/y is 10–14; a+b is 10–16; and the mole % of ethylene oxide in the polyether portion is 70–80 mole %.

4. The method of claim 1 in which x+y+2 is 67–80; x/y is 5–8; a+b is 10–16; and the mole % of ethylene oxide in the polyether portion is 70–100 mole %.

5. The method of claim 1 in which x+y+2 is 110–130; x/y is 5–8; a+b is 12–16; and the mole % of ethylene oxide in the polyether portion is 70–80 mole %.

6. The method of claim 1 in which the blowing agent comprises cyclopentane, isopentane, isobutane or mixtures thereof.

7. The method of claim 1 in which the blowing agent comprises a mixture ranging from <100 to 50 wt % cyclopentane and >0 to 50 wt % isopentane, based on C5 components, and optionally also containing butane isomers.

8. The method of claim 1 in which the blowing agent also contains a C1–C4 HFC or HCFC with a molecular weight of 50 to 170 g/mole and a boiling point of −60° to 50°C.

9. The method of claim 1 in which the blowing agent also contains HFC-134a, HFC-236ea, HFC-365mfc, HCFC-22 or HFC-245fa.

10. The method of claim 1 in which the blowing agent also comprises water at up to 4 pphp.

11. In a method for making a rigid polyurethane foam by reacting a polyisocyanate and a polyol in the presence of a urethane catalyst, a blowing agent, optionally water, and a silicone surfactant, the improvement which comprises employing a blowing agent comprising a C4 or C5 hydrocarbon, or mixtures thereof, with an average molecular weight of 72 g/mole and a boiling point in the range of 27.8 to 50° C., and 0.5 to 3.5 pphp silicone surfactant comprising a polyether-polysiloxane copolymer represented by the following formula:

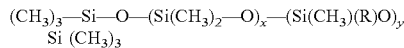

where

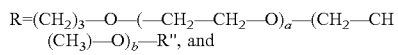

where R" is H or CH$_3$; x+y+2 is 110–130; x/y is 5–8; a+b is 12–16; the total surfactant molecular weight, based on the formula, is 15,000–28,000 g/mole, the wt % siloxane in the surfactant is 34–53 wt %, the average molecular weight of the polyether portion is 550–850 g/mole, and the mole % of ethylene oxide in the polyether portion is 70–100 mole %.

12. The method of claim 11 in which the blowing agent comprises cyclopentane, isopentane, isobutane or mixtures thereof.

13. The method of claim 11 in which the blowing agent comprises a mixture ranging from <100 to 50 wt % cyclopentane and >0 to 50 wt % isopentane, based on C5 components, and optionally also containing butane isomers.

14. The method of claim 11 in which the blowing agent also contains a C1–C4 HFC or HCFC with a molecular weight of 50 to 170 g/mole and a boiling point of –60° to 50° C.

15. The method of claim 11 in which the blowing agent also contains HFC-134a, HFC-236ea, HFC-365mfc, HCFC-22 or HFC-245fa.

16. The method of claim 11 in which the blowing agent also comprises water at up to 4 pphp.

17. A rigid polyurethane foam composition comprising the following components in parts by weight (pbw):

| Rigid Foam Formulation | pbw |
|---|---|
| Polyol | 100 |
| Silicone Surfactant | 1–3 |
| Blowing Agent | 10–20 |
| Water | 0–3 |
| Catalyst | 0.5–3 |
| Isocyanate Index | 80–400 | where the blowing agent comprises a C4 or C5 hydrocarbon, or mixtures thereof, with an average molecular weight of ≦72 g/mole and a boiling point in the range of 27.8 to 50° C. (82 to 121° F.), and the silicone surfactant comprises a polyether-polysiloxane copolymer represented by the following formula:

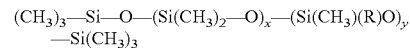

where

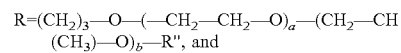

where R" is H, (CH$_2$)$_z$CH$_3$, or C(O)CH$_3$; x+y+2 is 67–130; x/y is 5–14; z is 0–4; a+b is 10–18; the total surfactant molecular weight, based on the formula, is 7000–30,000 g/mole, the wt % siloxane in the surfactant is 32–70 wt %, the average molecular weight of the polyether portion is 450–1000 g/mole, and the mole % of ethylene oxide in the polyether portion is 70–100 mole %.

18. The composition of claim 17 in which the blowing agent comprises cyclopentane, isopentane, isobutane or mixtures thereof.

19. The composition of claim 17 in which the blowing agent comprises a mixture ranging from <100 to 50 wt % cyclopentane and >0 to 50 wt % isopentane, based on C5 components, and optionally also containing butane isomers.

20. The composition of claim 17 in which the blowing agent also contains a C1–C4 HFC or HCFC with a molecular weight of 50 to 170 g/mole and a boiling point of –60° to 50° C.

21. The composition of claim 17 in which the blowing agent also contains HFC-134a, HFC-236ea, HFC-365mfc, HCFC-22 or HFC-245fa.

22. The composition of claim 17 in which the blowing agent comprises a mixture ranging from <100 to 50 wt % cyclopentane and >0 to 50 wt % isopentane, based on C5 components, and optionally also containing butane isomers, and the silicone surfactant is a polyether-polysiloxane copolymer represented by the following formula:

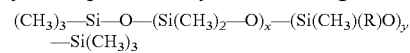

where

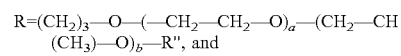

where R" is H or CH$_3$; x+y+2 is 110–130; x/y is 5–8; a+b is 12–16; the total surfactant molecular weight, based on the formula, is 15,000–28,000 g/mole, the wt % siloxane in the surfactant is 34–53 wt %, the average molecular weight of the polyether portion is 550–850 g/mole, and the mole % of ethylene oxide in the polyether portion is 70–100 mole %.

* * * * *

UNITED STATES PATENT AND TRADEMARK OFFICE
CERTIFICATE OF CORRECTION

PATENT NO. : 7,183,330 B2
APPLICATION NO. : 10/736042
DATED : February 27, 2007
INVENTOR(S) : Wayne Robert Furlan et al.

It is certified that error appears in the above-identified patent and that said Letters Patent is hereby corrected as shown below:

Column 12, Line 64

In claim 8 delete the words "50°C" and insert the words -- +50°C --

Column 13, Line 9

In claim 11 delete the words "72" and insert the words -- <72 --

Column 13, Line 50

In claim 14 delete the words "50°" and insert the words -- +50° --

Column 14, Line 30

In claim 20 delete the words "50°" and insert the words -- +50° --

Signed and Sealed this

Twenty-fourth Day of April, 2007

JON W. DUDAS
*Director of the United States Patent and Trademark Office*